United States Patent
Poelstra et al.

(10) Patent No.: US 11,080,665 B1
(45) Date of Patent: *Aug. 3, 2021

(54) CRYPTOGRAPHICALLY CONCEALING AMOUNTS AND ASSET TYPES FOR INDEPENDENTLY VERIFIABLE TRANSACTIONS

(71) Applicant: Blockstream Corporation, Montreal (CA)

(72) Inventors: Andrew Poelstra, Austin, TX (US); Gregory Maxwell, Mountain View, CA (US); Adam Back, San Francisco, CA (US); Pieter Wuille, Mountain View, CA (US); Mark Friedenbach, San Jose, CA (US)

(73) Assignee: Blockstream Corporation, Montreal (CA)

( * ) Notice: Subject to any disclaimer, the term of this patent is extended or adjusted under 35 U.S.C. 154(b) by 184 days.

This patent is subject to a terminal disclaimer.

(21) Appl. No.: 15/894,793

(22) Filed: Feb. 12, 2018

Related U.S. Application Data

(63) Continuation-in-part of application No. 15/176,833, filed on Jun. 8, 2016.
(Continued)

(51) Int. Cl.
   *G06Q 20/06* (2012.01)
   *G06Q 20/38* (2012.01)
(52) U.S. Cl.
   CPC ..... *G06Q 20/0658* (2013.01); *G06Q 20/3829* (2013.01); *G06Q 2220/00* (2013.01)

(58) Field of Classification Search
   CPC .......... G06Q 20/0658; G06Q 20/3829; G06Q 2220/00
   (Continued)

(56) References Cited

U.S. PATENT DOCUMENTS

| | | | |
|---|---|---|---|
| 2012/0089494 A1* | 4/2012 | Danezis | G06Q 50/06 705/34 |
| 2012/0296829 A1* | 11/2012 | Camenisch | G06Q 30/0603 705/67 |

(Continued)

OTHER PUBLICATIONS

Rivest et al. (How to Leak a Secret, C. Boyd (Ed.): ASIACRYPT 2001, LNCS 2248, pp. 552-565, 2001, © Springer-Verlag Berlin Heidelberg 2001) (Year: 2001).*

(Continued)

*Primary Examiner* — James D Nigh
(74) *Attorney, Agent, or Firm* — Dergosits & Noah LLP; Todd A. Noah

(57) ABSTRACT

Systems and methods are described for encrypting amounts and asset types of a verifiable transaction on a blockchain ledger. For each asset, an asset tag is blinded, multiplied by the amount of the asset, and the product is blinded again to create an encrypted amount of the asset. Both encrypted amount of the asset and a corresponding generated output value are within a value range, and the sum of the encrypted input value and the encrypted output value equals zero. Rangeproofs for each of the encrypted output values are associated with a different public key. Each public key is signed with a ring signature based on a public key of a recipient. A second ring signature is used to verify each asset tag, where the private key of the second ring signature for each asset is a difference between a first blinding value and an output coefficient.

15 Claims, 10 Drawing Sheets

Related U.S. Application Data

(60) Provisional application No. 62/457,523, filed on Feb. 10, 2017, provisional application No. 62/172,684, filed on Jun. 8, 2015.

(58) Field of Classification Search
USPC .......................................................... 705/71
See application file for complete search history.

(56) References Cited

U.S. PATENT DOCUMENTS

| | | | |
|---|---|---|---|
| 2019/0164153 A1* | 5/2019 | Agrawal | H04L 9/008 |
| 2019/0236881 A1* | 8/2019 | Ivanov | H04L 9/088 |

OTHER PUBLICATIONS

Möser (Anonymity of Bitcoin Transactions: An Analysis of Mixing Services, Münster Bitcoin Conference (MBC), Jul. 17-18, 2013, Münster, Germany, 10 pages) (Year: 2013).*
Van Saberhagen (CryptoNote v 2.0, Oct. 17, 2013, 20 pages) (Year: 2013).*

* cited by examiner

CRYPTOGRAPHICALLY CONCEALING AMOUNTS AND ASSET TYPES FOR INDEPENDENTLY VERIFIABLE TRANSACTIONS

CROSS-REFERENCE TO RELATED APPLICATIONS

This application claims the benefit of U.S. Provisional Application No. 62/457,523, filed Feb. 10, 2017, and is also a continuation-in-part of U.S. patent application Ser. No. 15/176,833, filed Jun. 8, 2016, which claims the benefit of U.S. Provisional Application No. 62/172,684, filed Jun. 8, 2015, each of which are incorporated herein in their entirety.

COPYRIGHT NOTICE

A portion of the disclosure of this patent document including any priority documents contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

One or more implementations relate generally to digital cryptocurrencies, and more specifically systems and methods of encrypting amounts and asset types for transactions in a digital cryptocurrency ledger such the transaction's validity may still be verified by the network using publicly available information.

SUMMARY OF THE INVENTION

Systems and methods are described for encrypting amounts and asset types transacted on a blockchain ledger while preserving the transaction's ability to be verified. Building upon confidential transactions described in related application U.S. patent application Ser. No. 15/176,833, encrypted amounts of any desired number of encrypted asset types may be transacted while preserving the identity of the parties to the transaction. A processor may receive a first amount of a first asset and a second amount of a second asset to be transacted. Each asset may have an associated asset tag, the associated asset tags being uniformly random elliptic curve points whose discrete logarithms are not known with respect to each other. A first blinding value may be added to each asset tag being transacted to create blinded asset tags for each asset, the blinded asset tags being uniformly random elliptic curve points. A blinded asset amount for each asset may be obtained by multiplying the first amount by the first blinded asset tag and the second amount by the second blinded asset tag. Encrypted amounts of each asset may then be created by adding, for each received asset, a second blinding value to each blinded asset amount. An output value corresponding to the input value may then be generated and encrypted to create an encrypted output value. The encrypted output value may include an output blinding amount such that the first blinding value and the output value blinding amount of an asset cancel each other out when added together. Both the received amounts and the generated output values for each asset may be set to fall within a value range, the value range being defined so that a sum of any two values within the range does not exceed an overflow threshold, and such that a sum of the encrypted amounts and encrypted output values for each asset equals zero.

To further assist verification of the amounts of the transaction, a plurality of rangeproofs may be generated for each received asset, wherein different rangeproofs are associated with each of the generated output values. The rangeproofs may show that the value associated with each rangeproof falls within the value range, and each rangeproof may be associated with a different public key. Each public key may be cryptographically signed with a first ring signature based on a public key of a recipient in the transaction, thereby encrypting the plurality of rangeproofs. To optimize memory usage, a single memory amount may be shared among each public key.

To further assist verification of the asset types, differences between the output values and the received amounts of each asset may be generated. These differences for each asset may be signed with a second ring signature that has a difference between the first blinding value and an output coefficient as a private key, which encrypts the differences for each asset into an asset surjection proof. The encrypted received amounts, the encrypted output values, the first ring signatures and the second ring signatures may then be stored in a block, the block being published on a blockchain where it may be subsequently verified.

Further described are systems and methods for performing verification of an encrypted transaction having a plurality of different assets on a blockchain ledger. For each asset type, the encrypted received amount, the encrypted output value, first ring signature, and second ring signature are received in a block appended to the blockchain. The encrypted received amount and the encrypted output value are extracted from the received block. The encrypted received amount, as described above, includes an amount received of an asset, a blinded asset tag associated with the asset type and a second blinding value. The blinded asset tag includes a first blinding value, and the encrypted output value includes an associated blinding amount. The transaction is verified if the sum of the encrypted input value and the encrypted output value is zero, and the transaction is denied verification if the sum of the encrypted input value and the encrypted output value is a nonzero value.

In an embodiment, the amount transacted on the blockchain ledger may be decrypted (e.g., by a recipient of the amount transacted) by first retrieving the block from the blockchain. The ring signature may be generated using a private key (e.g., of the recipient), the ring signature being associated with a correctly-valued public key for each digit of the encrypted input value. The correctly-valued public key may be selected from a group of four public keys for each digit of the encrypted input value. An XOR operation may be applied to the smallest digit of the ring encrypted input value, and the applying may be repeated for each digit. A repeated pattern within an output of the XOR operation may be identified. The positions of the repeated pattern within the output of the XOR operation may then be used to determine the input value from the encrypted input value.

In addition to the foregoing, improved rangeproof encoding systems and methods for providing confidential transactions are described herein. Encrypted input values and output values as described above are created by a processor. Each encrypted input value and output value is converted into a plurality of scalar values having a predetermined number of decimal places. A selected scalar may be set to zero, and the remainder of each plurality of scalar values may be normalized based on the original value of the selected scalar, reducing the number of scalar values for both the input value and the output value by one (and correspondingly reducing the size of the rangeproof).

BRIEF DESCRIPTION OF THE DRAWINGS

In the following drawings like reference numbers are used to refer to like elements. Although the following figures depict various examples, the one or more implementations are not limited to the examples depicted in the figures.

DETAILED DESCRIPTION

Figure 1:
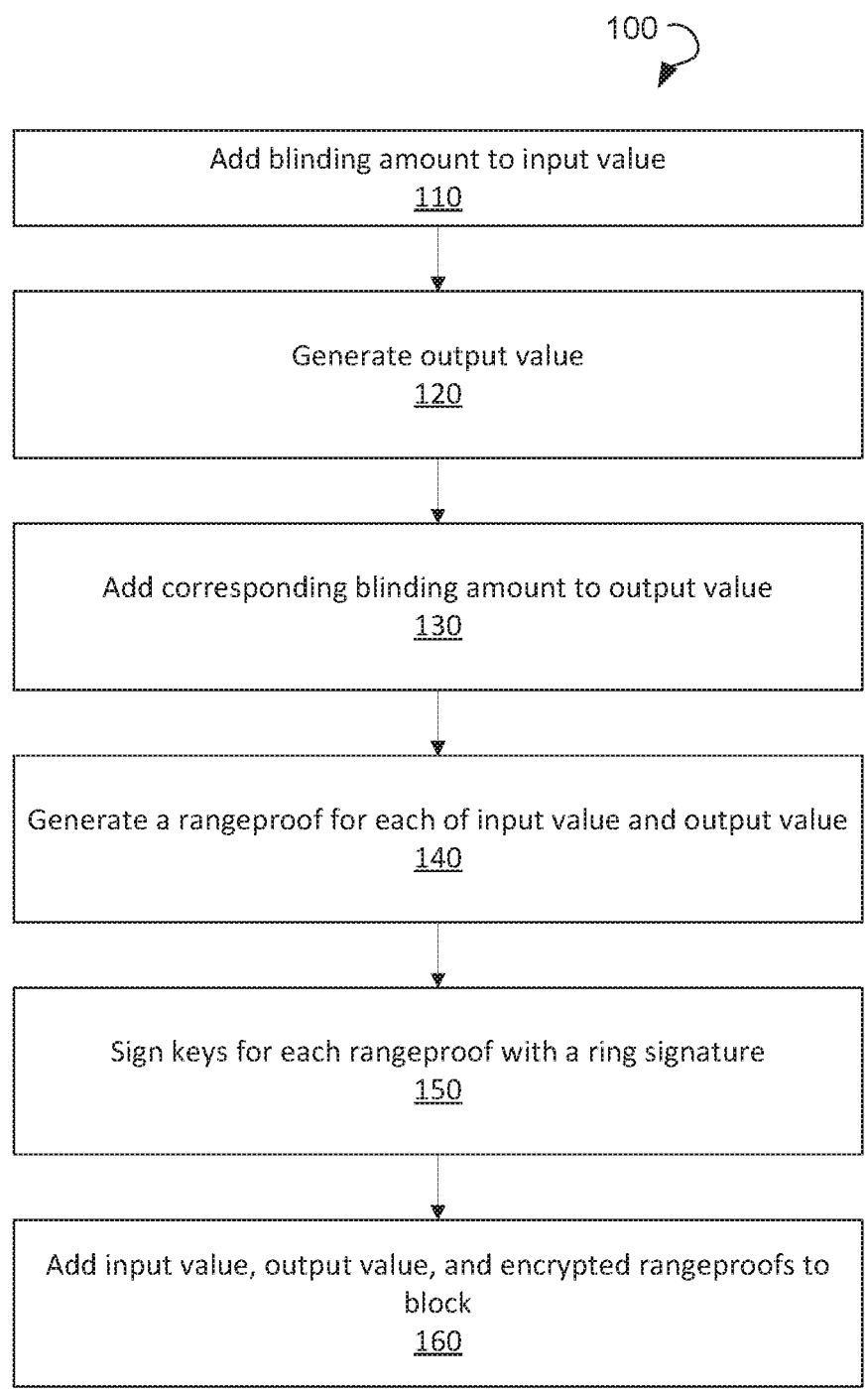
FIG. 1 shows a flow diagram for a encrypting an amount transacted on a blockchain ledger, in an embodiment.

The security of conventional cryptocurrencies, such as a Bitcoin ledger, is based on universal verification: each participant individually and autonomously verifies that each transaction is valid, without trusting any third party. An unfortunate side effect is that all the transaction data must be conspicuously public so it can be verified, which is at odds with the normal expectation of privacy for traditional monetary instruments. Insufficient financial privacy can have serious security and privacy implications for both commercial and personal transactions. Without adequate protection, dishonest users can focus their efforts on known high-value targets, competitors can learn business details, and negotiating positions can be undermined. Since publishing often requires spending money, lack of privacy can chill free speech. Insufficient privacy can also result in a loss of fungibility—where some coins are treated as more acceptable than others—which would further undermine a cryptocurrency's utility as money.

Bitcoin partially addresses the privacy problem by using pseudonymous addresses. If someone does not know which users own which addresses, the privacy impact may be reduced. But any time a transaction is made with a user, at least one of that user's addresses becomes known to the other party of the transaction. From there, the other party could trace out other connected addresses and estimate the values of their transactions and holdings. For example, suppose an employer pays an employee with Bitcoin, and the employee later spends those coins on rent and groceries. Both the employee's landlord and the supermarket would learn the employees income (and could charge higher prices as the employee's income changes or target the employee for theft).

There are existing deployed techniques that further improve privacy in Bitcoin (such as CoinJoin, which merges the transaction history of users by making joint payments), but the utility of these techniques is reduced by the fact that it's possible to track amounts. There have been proposed cryptographic techniques to improve privacy in Bitcoin-like systems, but so far all of them may result in breaking "pruning" and result in participants needing a perpetually growing database to verify new transactions, because these systems prevent learning which coins have been spent. Most proposed cryptographic privacy systems also have poor performance, high overhead, and/or require new and very strong (and less well understood) cryptographic assumptions.

The systems and methods described herein improve the situation by making the transaction amounts private, while preserving the ability of the public network to verify that the ledger entries still add up. This may be done without adding any new basic cryptographic assumptions to the Bitcoin system, and with a manageable level of overhead. As a side-effect of its design, the additional exchange of private "memo" data (such as invoice numbers or refund addresses) may be allowed by the described encryption methods, without any further increase in transaction size, by reclaiming most of the overhead of the cryptographic proofs used to make the transaction amounts private.

FIG. 1 shows a flow diagram 100 for a encrypting an amount transacted on a blockchain ledger, in an embodiment.

A processor may add a blinding amount to an input value being transacted to create an encrypted input value at step 110. To encrypt an input value of a transaction, a particular type of commitment may be selected that preserves the additive property. A commitment scheme maintains data secrecy but commits to the data so that it cannot be changed later by the sender of the data. A simple commitment scheme can be constructed using an exemplary cryptographic hash:

$$\text{commitment} = SHA256(\text{blinding\_factor} \| \text{data})$$

If a party only knows the commitment, then they cannot determine what underlying data values have been committing to (given certain assumptions about the properties of the hash). Both the data and the blinding factor may be revealed later, and a recipient of the commitment can run the hash and verify that the committed data matches the revealed data. The blinding factor is present because without one, someone could try guessing at the data.

A Pedersen commitment works like the above but with an additional property: commitments can be added, and the sum of a set of commitments is the same as a commitment to the sum of the data (with a blinding key set as the sum of the blinding keys):

$$C(BF1, \text{data1}) + C(BF2, \text{data2}) == C(BF1+BF2, \text{data1}+\text{data2})$$

$$C(BF1, \text{data1}) - C(BF1, \text{data1}) == 0$$

In other words, the commitment preserves addition and the commutative property applies (i.e., the Pedersen commitment is additively homomorphic, in that the underlying data may be manipulated mathematically as if it is not encrypted. For example, given input data values data_n={1,1,2} and a blinding factor BF_n={5,10,15} then:

$$C(BF1, data1)+C(BF2, data2)-C(BF3, data3)==0.$$

In an embodiment, Pedersen commitments used to encrypt the input value may be constructed using elliptic curve points. Conventionally, an elliptic curve cryptography (ECC) pubkey is created by multiplying a generator for the group (G) with the secret key (x):

$$Pub=xG.$$

The result may be serialized as a 33-byte array. ECC public keys may obey the additively homomorphic property mentioned before with respect to Pedersen commitments. That is:

$$Pub1+Pub2=(x1+x2 \pmod{n})G.$$

The Pedersen commitment for the input value may be created by picking an additional generator for the group (H, in the equations below) such that no one knows the discrete log for second generator H with respect to first generator G (or vice versa), meaning no one knows an x such that xG=H. This may be accomplished, for example, by using the cryptographic hash of G to pick H:

$$H=\text{to\_point}(SHA256(ENCODE(G))).$$

Given the two generators G and H, an exemplary commitment scheme to encrypt the input value may be defined as:

$$commitment=xG+aH$$

Here x may be the secret blinding factor, and a may be the input value being committing to. The Pedersen commitments are information-theoretically private: for any commitment, there exists some blinding factor which would make any amount match the commitment. The Pedersen commitments may be computationally secure against fake commitment, in that the arbitrary mapping may not be computed. If the commitment may be computed, it means that the discrete log of G and H with respect to one another are known, which means that the security of the group is compromised.

Accordingly, the normal 8-byte integer amounts in Bitcoin transactions may be replaced by 33-byte Pedersen commitments in some embodiments. An output value corresponding to the input value may be generated and encrypted (e.g. also using the Pedersen commitment described above) to create an encrypted output value at step 120. The encrypted output value may include a corresponding blinding amount, added at step 130, such that the input value blinding amount and the generated output value blinding amount cancel each other out when added together. That is, if the sender of an asset in a transaction takes care in picking the blinding factors so that they add up correctly, then the network can still verify the transaction by checking that its commitments add up to zero:

$$(In1+In2+In3+\text{plaintext\_input\_amount}*H\ldots)-(Out1+Out2+Out3+\ldots \text{fees}*H)==0.$$

Verification using the Pedersen commitment may require making the fees in a transaction explicit. However, this may be desirable Unfortunately, without additional measures, a Pedersen commitment alone may be insecure. The problem is that the group is cyclic, and addition is mod P (a 256-bit prime number that defines the order of the group). As a result, addition of large values can 'overflow' and behave like negative amounts. This means that a sums-to-zero behavior still holds when some outputs are negative, effectively allowing the creation of 5 coins from nothing: (1+1)−(−5+7)==0 This would be interpreted as "a userspends two bitcoins, gets a '−5' bitcoin out that they discard out, and a 7 bitcoin output," thereby allowing a malicious user to cause currency inflation.

In order to prevent this, when there are multiple outputs a proof is used to show that each committed generated output is within a value range which cannot overflow (e.g. [0, 2^64]). Both the input value and the output value being transacted may be values falling with the value range, the value range being defined so that a sum of any two values within the range does not exceed an overflow threshold (e.g., the maximum possible value, such as 2^64). The value range may be set by the sender of the asset associated with the input value in some embodiments.

Accordingly, a plurality of rangeproofs may be generated at step 140, wherein a different rangeproof is associated with each of the input value being transacted and the generated output value. The rangeproofs may prove that a committed amount is within the value range but reveal nothing else about the value. If an ECC signature is constructed so that the 'message' is a hash of the pubkey, the signature may prove that the signer knew the private key, which is a discrete log of the pubkey with respect to some generator (like G or H discussed above). For a 'pubkey' like P=xG+aH, no one knows the discrete log of P with respect to G because of the addition of H, because no one knows an x for xG=H, except for the edge case where the input value a is 0. If a is zero then P=xG and the discrete log is just x; someone could sign for that pubkey.

The rangeproofs may show that the value associated with each rangeproof falls within the value range, and each rangeproof may be associated with a different public key, signed at step 150. Each public key may be cryptographically signed with a ring signature based on a public key of a recipient in the transaction, thereby encrypting the plurality of rangeproofs. To avoid giving away the input value being transacted, a ring signature may be used. A ring signature is a signature scheme where there are two (or more) pubkeys and the signature proves that the signer knows the discrete log of at least one of the pubkeys. The ring signature together with the range proof may prove a commitment that commitment C is either 0 or 1—also known as an "OR proof". First, commitment C to the input value is provided, and C is computed by a recipient of the input value (using a private key held by the recipient, which includes the blinding factor):

$$C'=C-1H.$$

Then a ring signature over {C, C'} is provided. If C was a commitment to 1 then the recipient would not know its discrete log, but C' becomes a commitment to 0 and the recipient would know its discrete log (just the blinding factor, known by the recipient). If C was a commitment to 0, the recipient would know its discrete log, and would not know the discrete log for C'. If C was a commitment to any other amount, none of the results of the ring signature would be zero and the recipient won't be able to sign to decrypt the encrypted input value. This works for any pair of numbers, just by suitably pre-processing the amounts that are put into the ring . . . or even for more than two numbers. For example, in a case where a sender wishes to generate a rangeproof showing that commitment C is in the value range [0, 32]. The sender may send the recipient a collection of commitments and OR proofs for each of them. Each commitment may be associated with a digit of the input value. For example, the following commitments may be included in a rangeproof:

C1 is 0 or 1 C2 is 0 or 2 C3 is 0 or 4 C4 is 0 or 8 C5 is 0 or 16.

If the sender selects the blinding factors for C1-5 correctly then C1+C2+C3+C4+C5=C. Effectively the input value has been built in binary, and the resulting 5-bit number can only be in the range [0,32].

Numerous optimizations may make rangeproof generation more efficient. To optimize memory usage, a single memory amount may be shared among each pubkey. For example, a Borromean ring signature may be used, which is especially efficient: it requires only 32 bytes per pubkey, plus 32 bytes which can be shared by many separate rings. The Borromean ring may have twice the asymptotic efficiency of previously proposed constructions for this application. In a further embodiment, each rangeproof may include a plurality of component values, where each component value is a base ten exponent. That is, instead of expressing the amount directly in binary, encrypted amounts may be expressed using a decimal floating point where the digits are multiplied by a base 10 exponent. This means that large amounts may be proven with relatively small proofs, so long as they have few significant digits in base 10: e.g., 11.2345 and 0.0112345 can have the same size proof, even though one number is a thousand times larger. The ring signature may further be associated with a leftover amount that is not scaled by an exponent in some embodiments. In embodiments using base ten, for example, numbers less than ten would not be scaled by an exponent. The number less than ten could be expressed as a non-private "minimum amount" sent, which allows a smaller proof to cover a larger range if the user doesn't mind leaking some information about the minimum amount (which might already be public for external reasons); this also allows the least significant digits to be non-zero when an exponent is used. Minimum amounts may be supported by first subtracting the minimum, then proving that the result is non-negative.

Figure 2:
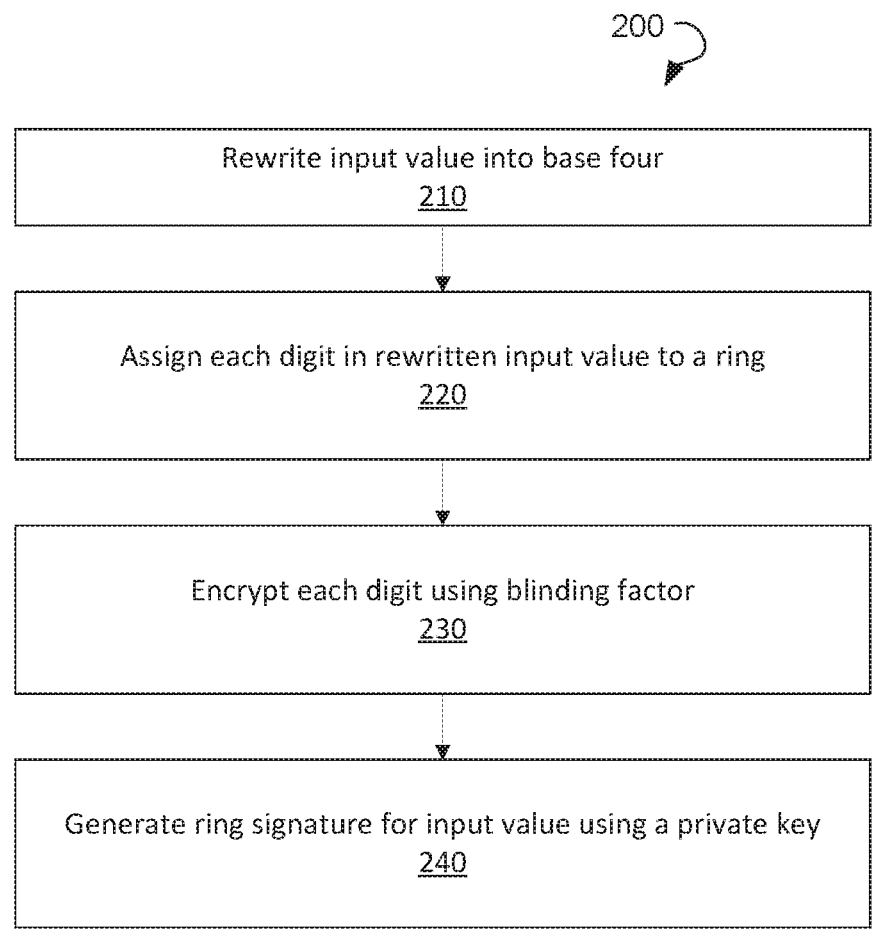
FIG. 2 shows a flow diagram for creating a ring signature for an encrypted input value, in an embodiment.

FIG. 2 shows a flow diagram for an exemplary method 200 for creating a ring signature for an encrypted input value. In the exemplary embodiment of method 200, referred to herein as a Borromean ring signature, the input value is rewritten into base four at step 210. The mantissa of the floating point may be encoded using rings of size 4 (base 4) rather than binary, because this may minimize the number of commitments sent while not using any more signature data than base two. The final mantissa digit commitment can be skipped, backwards constructing it from the value being proven and the other digits, etc.

Figure 4:
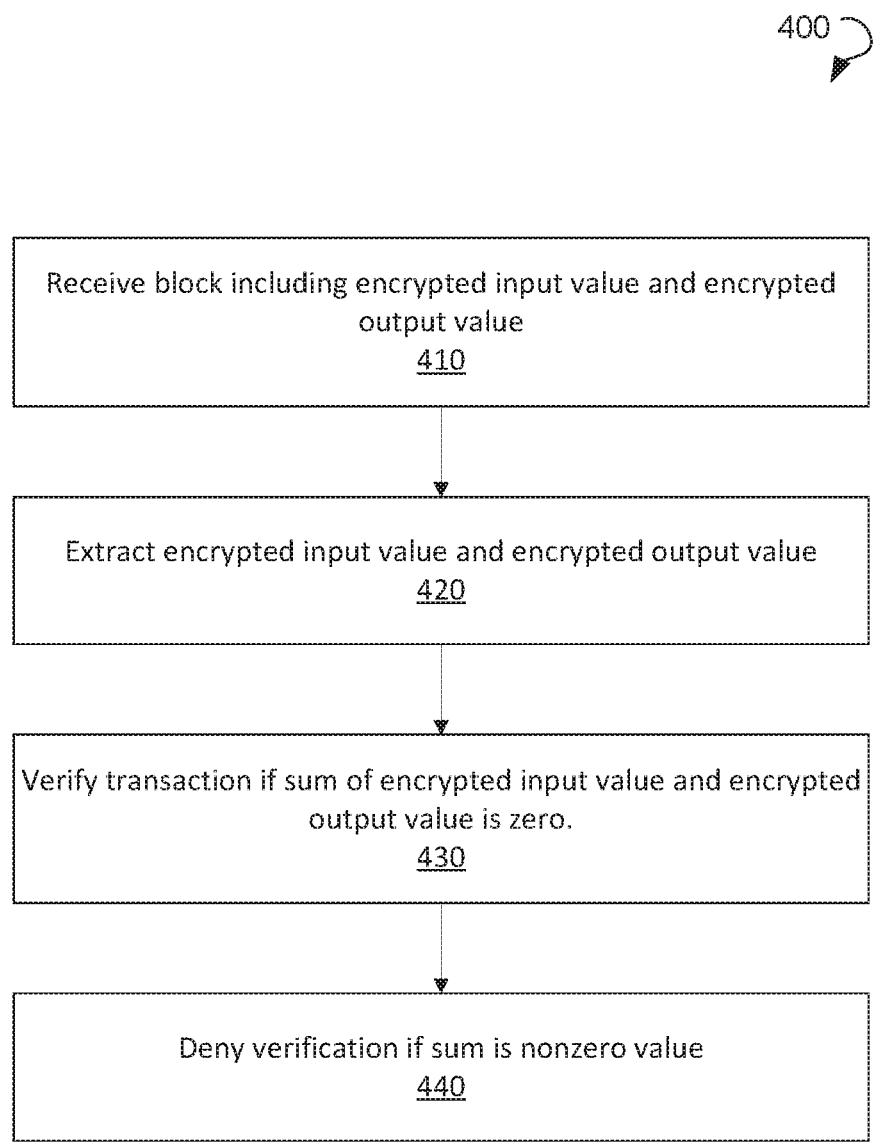
FIG. 4 shows a flow diagram for verifying an encrypted transaction on a blockchain, in accordance with various embodiments of the present invention.

Each digit in the rewritten input value may be assigned to a ring at step 220, where each ring has four public keys corresponding to possible values of the digit. Each digit may be encrypted using a digit-specific blinding factor at step 230, and a potential value for the digit may be assigned to a public key for that digit. The ring signature may then be generated using a private key at step 240, the ring signature being associated with a correctly-valued public key for each digit. Returning to FIG. 1, the encrypted input value, the encrypted output value, and the encrypted rangeproofs may be stored in a block at step 160. The block may then be published on a blockchain, where it may be subsequently verified. FIG. 4 shows a flow diagram for an exemplary method 400 for verifying an encrypted transaction on a blockchain. The encrypted input value, the encrypted output value, and the encrypted rangeproofs are received in a block appended to the blockchain at step 410. The encrypted input value and the encrypted output value may be extracted from the received block at step 420. As described above, the encrypted input value may include the input value being transacted and a blinding amount. The encrypted output value may also include an associated blinding amount. The transaction is verified at step 430 if the sum of the encrypted input value and the encrypted output value is zero. Likewise, the transaction is denied verification if the sum of the encrypted input value and the encrypted output value is a nonzero value at step 440. Accordingly, the transaction may be verified as a valid transaction, where the inputs equal the outputs, without a verifier actually knowing the amounts transacted.

Figure 3:
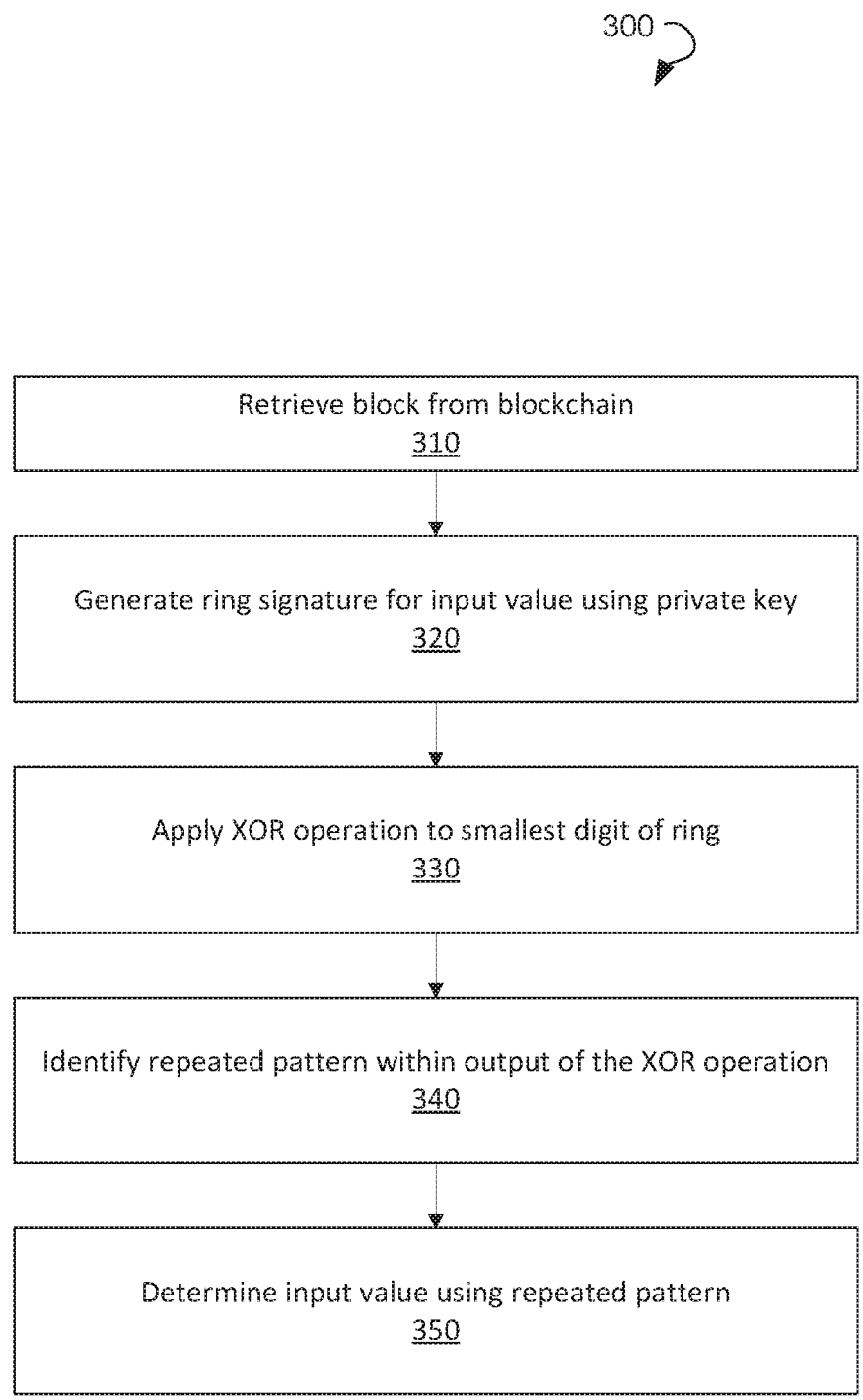
FIG. 3 shows a flow diagram for decrypting an input value from an encrypted input value signed with a ring signature, in accordance with various embodiments of the present invention.

As for the recipient of the asset having the input value, the input value may be decrypted using a private key held by the recipient. FIG. 3 shows a flow diagram for an exemplary method 300 for decrypting an input value from an encrypted input value signed with a ring signature. The block may be retrieved from the blockchain at step 310. The ring signature, generated during the encryption process may be regenerated using a private key (e.g., of the recipient) at step 320. The ring signature may be associated with a correctly-valued public key for each digit of the encrypted input value, in addition to a plurality of incorrectly-valued public keys for each digit. The correctly-valued public key may be selected from a group of, for example, four public keys for each digit of the encrypted input value. An XOR operation may be applied to each digit of the ring-encrypted input value, starting with the smallest digit, at step 330. The applying the XOR operation may be repeated for each digit of the encrypted input value. A repeated pattern within an output of the XOR operation may be identified at step 340. The positions of the repeated pattern within the output of the XOR operation may then be used to determine the input value from the encrypted input value at step 350.

Finally, by careful use of derandomized signing in the proof, it's possible for the receiver of the coins—who shares a secret with the sender, due to ECDH key agreement with the receivers pubkey—to 'rewind' the proof and use it to extract a message sent by the sender, which may be up to 80% of the size of the proof. The message may be used, for example, to provide the value and blinding factor to the receiver, but could also be used to include information like reference numbers or refund addresses. The result is that a proof for a 32-bit value is 2564 bytes, and simultaneously may convey 2048 bytes of message. A 32-bit proof can cover a range of 42.94967296 BTC with 1e-8 precision, or 429.4967296 BTC with 1e-7 precision, and so on. The implementation supports proofs of any mantissa size or exponent, with the parameters controlled by the sender. Performance and size may be linear in the number of mantissa bits, and odd numbers of bits are supported (by switching to radix-2 for the last digit). In some embodiments, the rangeproofs are only required in cases where there are multiple confidential value outputs (including fees). Transactions that merge multiple confidential amounts into a single output may not need range proofs, since the fact that all the inputs were in range may provide sufficient protection against overflow.

Figure 5:
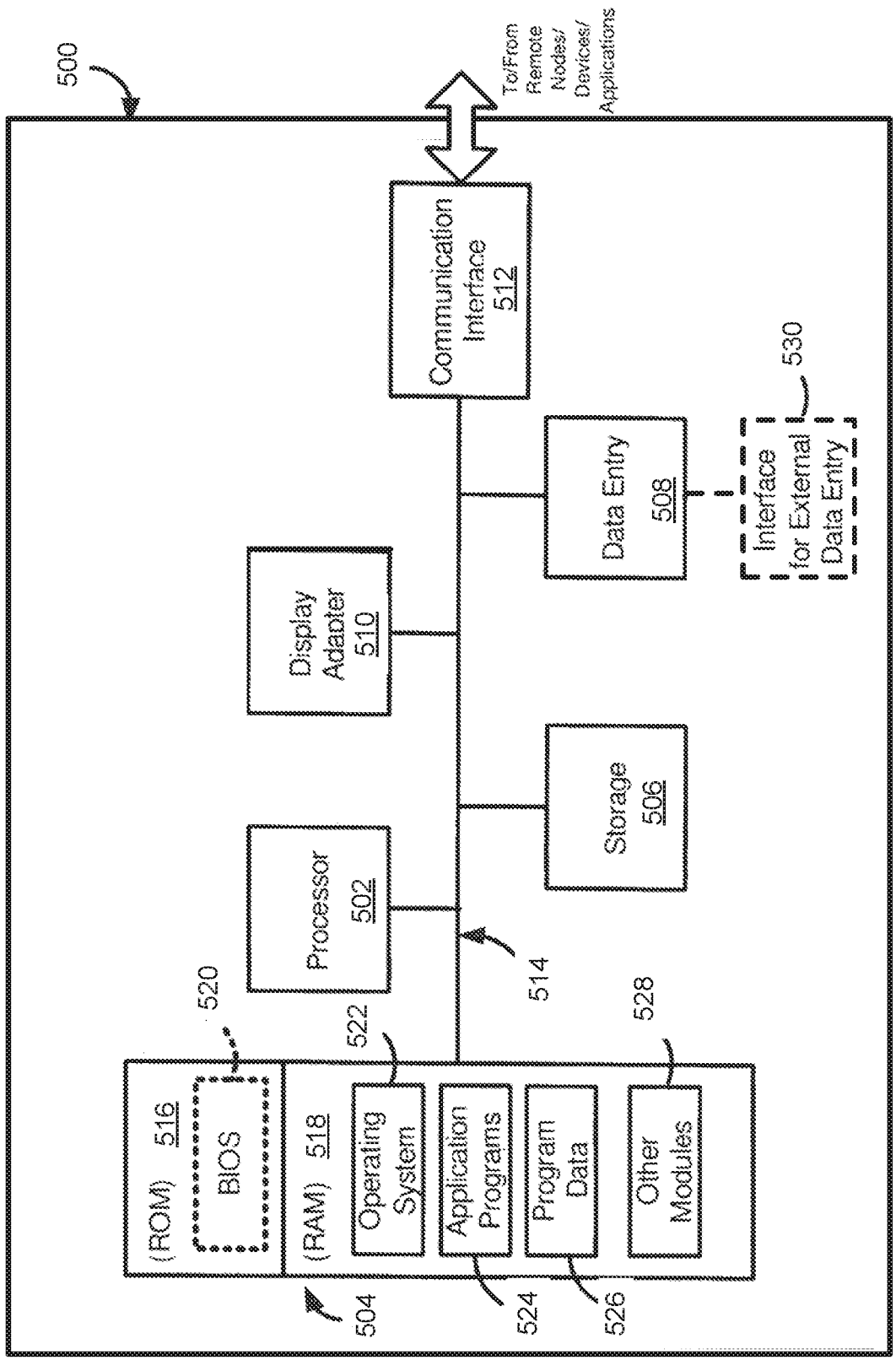
FIG. 5 is a block diagram of an exemplary system used for encrypting transaction values on a blockchain in accordance with various embodiments of the present invention.

FIG. 5 is a block diagram of an exemplary system for providing a pegged sidechain in accordance with various embodiments of the present invention. With reference to FIG. 5, an exemplary system for implementing the subject matter disclosed herein, including the methods described above, includes a hardware device 500, including a processing unit 502, memory 504, storage 506, data entry module 508, display adapter 510, communication interface 512, and a bus 514 that couples elements 504-512 to the processing unit 502.

The bus 514 may comprise any type of bus architecture. Examples include a memory bus, a peripheral bus, a local bus, etc. The processing unit 502 is an instruction execution machine, apparatus, or device and may comprise a microprocessor, a digital signal processor, a graphics processing unit, an application specific integrated circuit (ASIC), a field programmable gate array (FPGA), etc. The processing unit 502 may be configured to execute program instructions stored in memory 504 and/or storage 506 and/or received via data entry module 508.

The memory 504 may include read only memory (ROM) 516 and random access memory (RAM) 518. Memory 504 may be configured to store program instructions and data during operation of device 500. In various embodiments, memory 504 may include any of a variety of memory technologies such as static random access memory (SRAM) or dynamic RAM (DRAM), including variants such as dual data rate synchronous DRAM (DDR SDRAM), error correcting code synchronous DRAM (ECC SDRAM), or RAMBUS DRAM (RDRAM), for example. Memory 504 may also include nonvolatile memory technologies such as nonvolatile flash RAM (NVRAM) or ROM. In some embodiments, it is contemplated that memory 504 may include a combination of technologies such as the foregoing, as well as other technologies not specifically mentioned. When the subject matter is implemented in a computer system, a basic input/output system (BIOS) 520, containing the basic routines that help to transfer information between elements within the computer system, such as during start-up, is stored in ROM 516.

The storage 506 may include a flash memory data storage device for reading from and writing to flash memory, a hard disk drive for reading from and writing to a hard disk, a magnetic disk drive for reading from or writing to a removable magnetic disk, and/or an optical disk drive for reading from or writing to a removable optical disk such as a CD ROM, DVD or other optical media. The drives and their associated computer-readable media provide nonvolatile storage of computer readable instructions, data structures, program modules and other data for the hardware device 500.

It is noted that the methods described herein can be embodied in executable instructions stored in a non-transitory computer readable medium for use by or in connection with an instruction execution machine, apparatus, or device, such as a computer-based or processor-containing machine, apparatus, or device. It will be appreciated by those skilled in the art that for some embodiments, other types of computer readable media may be used which can store data that is accessible by a computer, such as magnetic cassettes, flash memory cards, digital video disks, Bernoulli cartridges, RAM, ROM, and the like may also be used in the exemplary operating environment. As used here, a "computer-readable medium" can include one or more of any suitable media for storing the executable instructions of a computer program in one or more of an electronic, magnetic, optical, and electromagnetic format, such that the instruction execution machine, system, apparatus, or device can read (or fetch) the instructions from the computer readable medium and execute the instructions for carrying out the described methods. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

A number of program modules may be stored on the storage 506, ROM 516 or RAM 518, including an operating system 522, one or more applications programs 524, program data 526, and other program modules 528. A user may enter commands and information into the hardware device 500 through data entry module 508. Data entry module 508 may include mechanisms such as a keyboard, a touch screen, a pointing device, etc. Other external input devices (not shown) are connected to the hardware device 500 via external data entry interface 530. By way of example and not limitation, external input devices may include a microphone, joystick, game pad, satellite dish, scanner, or the like. In some embodiments, external input devices may include video or audio input devices such as a video camera, a still camera, etc. Data entry module 508 may be configured to receive input from one or more users of device 500 and to deliver such input to processing unit 502 and/or memory 504 via bus 514.

The hardware device 500 may operate in a networked environment using logical connections to one or more remote nodes (not shown) via communication interface 512. The remote node may be another computer, a server, a router, a peer device or other common network node, and typically includes many or all of the elements described above relative to the hardware device 500. The communication interface 512 may interface with a wireless network and/or a wired network. Examples of wireless networks include, for example, a BLUETOOTH network, a wireless personal area network, a wireless 802.11 local area network (LAN), and/or wireless telephony network (e.g., a cellular, PCS, or GSM network). Examples of wired networks include, for example, a LAN, a fiber optic network, a wired personal area network, a telephony network, and/or a wide area network (WAN). Such networking environments are commonplace in intranets, the Internet, offices, enterprise-wide computer networks and the like. In some embodiments, communication interface 512 may include logic configured to support direct memory access (DMA) transfers between memory 504 and other devices.

In a networked environment, program modules depicted relative to the hardware device 500, or portions thereof, may be stored in a remote storage device, such as, for example, on a server. It will be appreciated that other hardware and/or software to establish a communications link between the hardware device 500 and other devices may be used.

It should be understood that the arrangement of hardware device 500 illustrated in FIG. 5 is but one possible implementation and that other arrangements are possible. It should also be understood that the various system components (and means) defined by the claims, described above, and illustrated in the various block diagrams represent logical components that are configured to perform the functionality described herein. For example, one or more of these system components (and means) can be realized, in whole or in part, by at least some of the components illustrated in the arrangement of hardware device 500. In addition, while at least one of these components are implemented at least partially as an electronic hardware component, and therefore constitutes a machine, the other components may be implemented in software, hardware, or a combination of software and hardware. More particularly, at least one component defined by the claims is implemented at least partially as an electronic hardware component, such as an instruction execution machine (e.g., a processor-based or processor-containing machine) and/or as specialized circuits or circuitry (e.g., discrete logic gates interconnected to perform a specialized function), such as those illustrated in FIG. 5. Other components may be implemented in software, hardware, or a combination of software and hardware. Moreover, some or all of these other components may be combined, some may be omitted altogether, and additional components can be added while still achieving the functionality described herein. Thus, the subject matter described herein can be embodied in many different variations, and all such variations are contemplated to be within the scope of what is claimed.

In the description that follows, the subject matter will be described with reference to acts and symbolic representations of operations that are performed by one or more devices, unless indicated otherwise. As such, it will be understood that such acts and operations, which are at times referred to as being computer-executed, include the manipulation by the processing unit of data in a structured form. This manipulation transforms the data or maintains it at locations in the memory system of the computer, which reconfigures or otherwise alters the operation of the device in a manner well understood by those skilled in the art. The data structures where data is maintained are physical locations of the memory that have particular properties defined by the format of the data. However, while the subject matter is being described in the foregoing context, it is not meant to be limiting as those of skill in the art will appreciate that various of the acts and operation described hereinafter may also be implemented in hardware.

For purposes of the present description, the terms "component," "module," and "process," may be used interchangeably to refer to a processing unit that performs a particular function and that may be implemented through computer program code (software), digital or analog circuitry, computer firmware, or any combination thereof.

It should be noted that the various functions disclosed herein may be described using any number of combinations of hardware, firmware, and/or as data and/or instructions embodied in various machine-readable or computer-readable media, in terms of their behavioral, register transfer, logic component, and/or other characteristics. Computer-readable media in which such formatted data and/or instructions may be embodied include, but are not limited to, physical (non-transitory), non-volatile storage media in various forms, such as optical, magnetic or semiconductor storage media.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

As described above, some cryptocurrencies, such as Bitcoin, with no trusted issuer or transaction processor, use a publicly verifiable distributed ledger (i.e., a blockchain). The blockchain may include every transaction since its establishment, resulting in a final state, the unspent transaction output set (UTXO set), which describes the amounts and owners of all coins.

Each UTXO contains an amount and a verification key; transactions destroy UTXOs and create new ones of equal or lesser total amount, and must be signed with the keys associated to each destroyed UTXO. This model allows all users to verify transaction correctness without trusting any payment processor to be honest or reliable. However, this model has a serious cost to user privacy, since every transaction is preserved forever, exposing significant amounts of information directly and indirectly.

One conventional technique to obscure transaction structure is used by CoinJoin, which allows users to interactively combine transactions, obscuring which inputs map to which outputs. However, because transaction amounts are exposed, it is difficult to use CoinJoin in such a way that these mappings cannot be recovered, at least in a statistical sense. In particular, unless all output amounts are the same, they are distinguishable and may be grouped.

One solution to the exposure of transaction data is described above in FIG. 1, which blinds the amounts of all outputs, while preserving public verifiability of the fact that the total output amount is equal to the total input amount. Each explicit UTXO amount is replaced by a homomorphic commitment to the amount; since these amounts are homomorphic over a finite ring rather than the set of integers, a rangeproof is attached to each output to prevent attacks related to overflow. The text below describes various improvements and expansions to the confidential transactions described above.

First, a space optimization of the underlying ring signature used in FIG. 1 is described. Then a new scheme, confidential assets, is described that further supports multiple asset types within single transactions. Public verifiability that no assets are created or destroyed is preserved, while hiding both the output amount(s) and the output asset type(s).

It would be desirable for blockchain technologies to support multiple asset types on the same chain. This may permit a wider set of users to share the security properties of the same chain, and also enables new use cases, such as multi-asset transactions which effect atomic exchanges. One could create support for multiple asset types by labelling each transaction output with a publicly visible "asset tag"; however, this would expose information about users' financial behavior. Confidential Assets (CA) is a technology to support multiple asset types with blinding of asset tags, which builds on the privacy benefits of the confidential transactions described above and extends the power and expressibility of blockchain transactions. Confidential Assets allows anybody to cryptographically verify that a transaction is secure: the transaction is authorized by all required parties and no asset is unexpectedly created, destroyed, or transmuted. However, only the participants in the transaction are able to see the identity of asset types involved and in what amounts.

Figure 6:
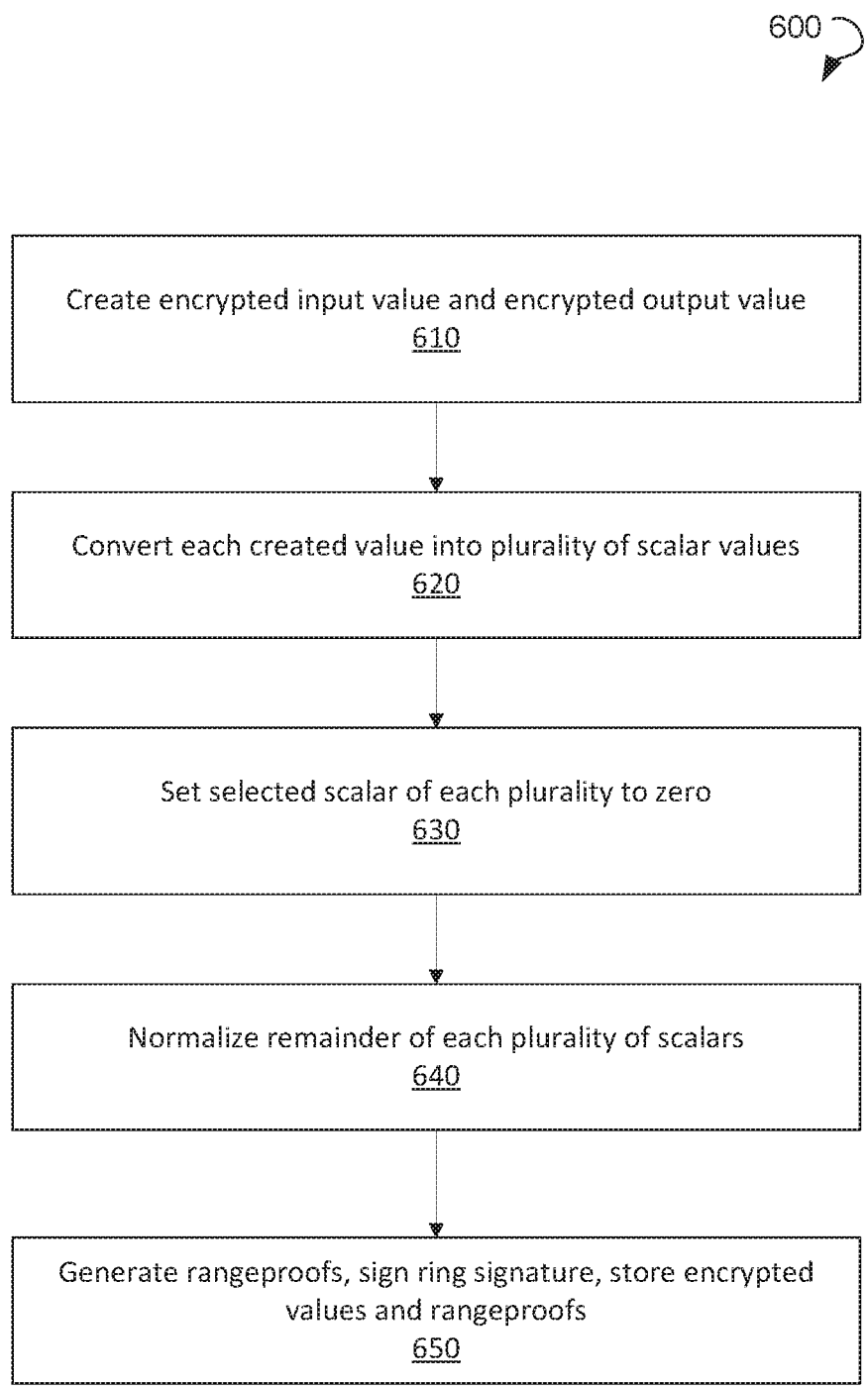
FIG. 6 shows a flow diagram for encrypting an amount transacted on a blockchain using a modified rangeproof, in an embodiment.

First, a space-optimized rangeproof will be described. FIG. 6 shows a flow diagram for an exemplary method 600 off encrypting an amount transacted on a blockchain using a modified rangeproof. Schoenmakers described a simple rangeproof of base-b digits using the conjunction of zero-knowledge OR proofs of each digit. See Schoenmakers, B., Interval proofs revisited (2005), slides presented at International Workshop on Frontiers in Electronic Elections, which is hereby incorporated by reference. The rangeproof described in FIG. 6 modifies the basic rangeproof concept in the following ways: the OR proofs are based on Borromean Ring Signatures, which allow sharing a random challenge across every digit's proof, and one scalar is removed from each proof by changing the commitment to each digit (without changing the digit itself) while the proof is generated.

Rangeproofs are created by a processor for encrypted output values as described in FIG. 1 at step 610. The creating may include splitting the output value into digits which sum to the encrypted output value. Each rangeproof is converted into a plurality of scalar values having a predetermined number of decimal places at 620 (as described in the rangeproofs above). In an embodiment, the created rangeproof may include a list of (unrelated) scalars, four scalars per digit. These scalars are part of the signature and are public data (so the sense in which the rangeproof is "converted" into scalars is simply that it is interpreted as a list of scalars). The bits (e.g., base 3/4 digits) are separate secret scalars which are used to compute the ring signature but do not appear in the final signature. A selected scalar may be set to zero at step 630 (e.g., the first scalar of the plurality), and the remainder of each plurality of scalar values may be normalized based on the original value of the selected scalar, reducing the number of scalar values for both the input value and the output value by one (and correspondingly reducing the size of the rangeproof) at step 640. In the exemplary embodiment having four scalars per bit, the remaining three scalars are renormalized before being added to the block on the ledger.

Consider a Pedersen commitment scheme with generators G, H, and let H: C->M be a random oracle hash.

Verify (C, $\pi = \{e_0, (C^0, s_1^0, s_2^0, \ldots, s_{m-1}^0), \ldots (C^{n-1}, s_1^{n-1}, \ldots, s_{m-1}^{n-1})\}$) works as follows:
1. For each $i \in \{0, \ldots, n-1\}$,
    (a) Define $e_0^i = e_0$ for consistency of the following equations.
    (b) For each $j \in \{1, \ldots, m-1\}$ compute
        $e_j^i \leftarrow H(s_j^i G - e_{j-1}^i [C^i - jm^iH])$ (1)
    (c) Compute $R^i \leftarrow e_{m-1}^i C^i$
2. Compute $\hat{e}_0 \leftarrow H(R^0 \| \ldots \| R^{n-1})$.
3. Accept if
    $\hat{e}_0 = e_0$; and
    $C = \Sigma_i C^i$.
Prove (v, r). Proving works as follows.
1. Write v in base m as $v^0 + v^1 m + \ldots + v^{n-1} m^{n-1}$, (Note that superscripts on m are exponents while superscripts on v are just superscripts.)
2. For each $i \in \{0, \ldots, n-1\}$, (a) If $v^i = 0$, choose $k_0^i \xleftarrow{\$} Z_q$ and set $R^i \leftarrow K_0^i G$.

(b) Otherwise,
        i. Choose
            $r^i$ uniformly randomly and compute $C^i \leftarrow \text{Commit}(m^i v^i, r^i)$.

ii. Choose $k_0^i \xleftarrow{\$} Z_q$ and compute $e_{v^i}^i \leftarrow H(k^i G)$.

iii. For each $j \in \{v^i + 1, \ldots, m-1\}$, choose $s_j^i \xleftarrow{\$} Z_q$, and compute $e_j^i$ directly from equation (1). (If $v^i = m - 1$, this step is a no-op.)

iv. Compute $R^i \leftarrow e_{m-1}^i C^i$.
3. Set $e_0 \leftarrow H(R^0 \| \ldots \| R^{n-1})$.
4. For each $i \in \{0, \ldots, n-1\}$,
    (a) If $v^i = 0$,
        i. For each $j \in \{1, \ldots, m-1\}$, choose $k_j^i \xleftarrow{\$} Z_q$ $e_j^i \leftarrow H(k_j^i + e_{j-1}^i m^i j H)$
            taking $e_0^i = e_0$.

ii. Set $C^i \leftarrow \dfrac{R^i}{e_{m-1}^i} = \dfrac{k_0^i}{e_{m-1}^2} G$.

iii. For each $j \in \{1, \ldots, m-1\}$, set $s_j^i \leftarrow k_j^i + \dfrac{k_0^i e_{j-1}^1}{e_{m-1}^2}$.

(b) Otherwise, i. For each $j \in \{1, \ldots, v^i - 1\}$, choose $s_j^i \xleftarrow{\$} Z_q$, and compute $e_j^i$ directly from equation (1) taking $e_0^1 = e_0$ (If $v_i - 1$ this is a no-op.)
        ii. Set $s_{v^i}^i = k^i + e_{v^i}^i 1^{r^j}$.

5. Set $C \leftarrow \sum_{i=0}^{n-1} C^i \cdot \text{Output}$ $\pi = \{e_0, (C^0, s_1^0, s_2^0, \ldots, s_{m-1}^0), \ldots (C^{n-1}, s_1^{n-1}, s_{m-1}^{n-1})\}$.

The resulting rangeproof is nearly the same construction as Borromean Ring Signatures, except for the following two differences:

- There are no $s_0^1$ values, which were used in the calculation of $\hat{e}_0$ in the Borromean Ring Signature construction, saving i scalars in the total proof.
- The commitments $C^i$ are no longer included in any hashes (which is necessary when computing sub-commitments to the digit (m−1), as seen in step 4(a)ii of the Prove algorithm above).

Unfortunately, the resulting construction may no longer be secure in general; the proof of security may rely on all keys being binding commitments rather than arbitrary public keys. The ring signature may be signed, the rangeproofs may be completed based on the adjusted scalar values, and the completed rangeproofs may be stored with the encrypted output values in a block on a ledger at step 650 (in the same manner as described with respect to steps 150 and 160 of FIG. 1).

Figure 7:
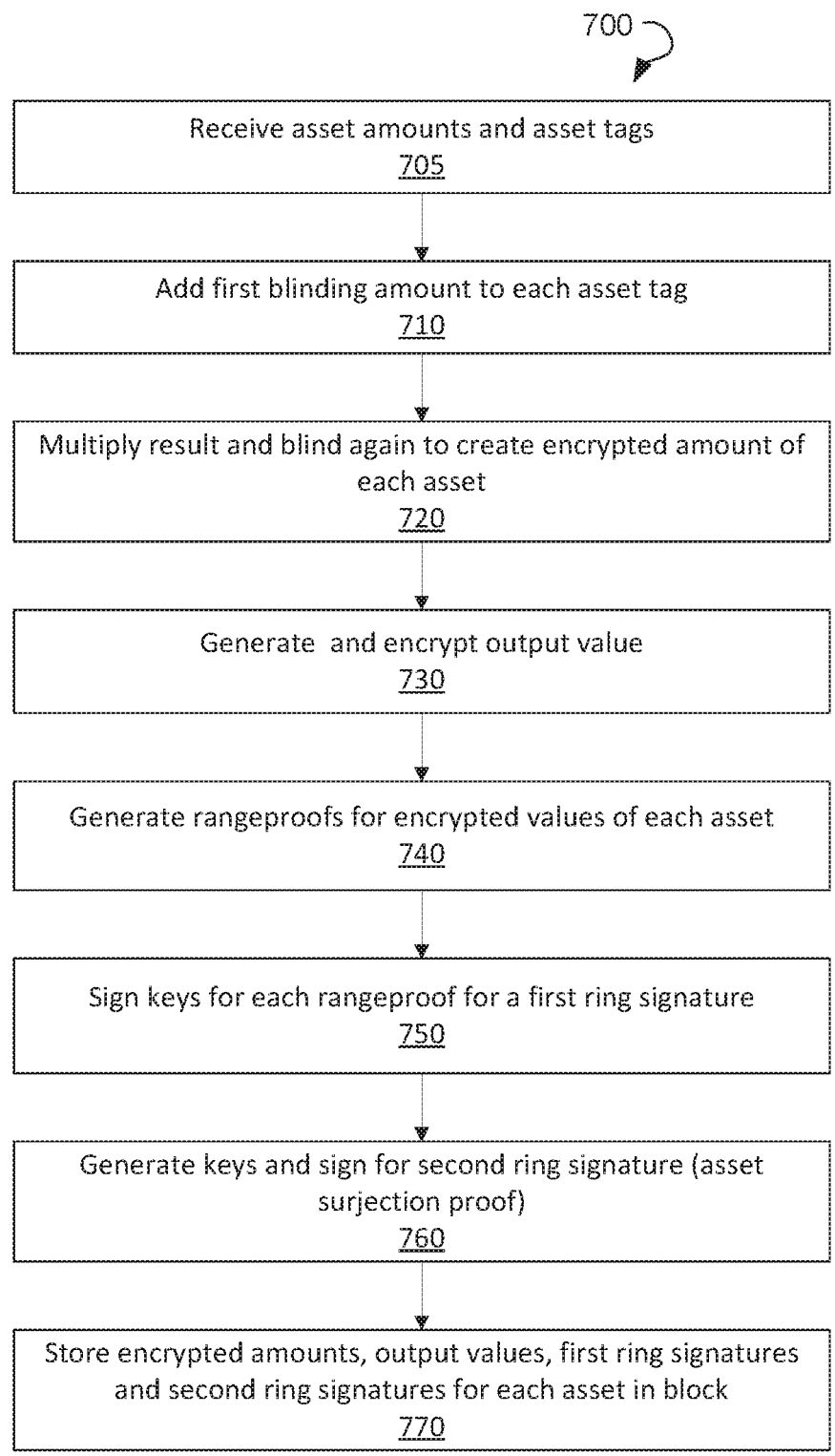
FIG. 7 shows a flow diagram for encrypting different amounts of different asset types transacted on a blockchain ledger, in an embodiment.

FIG. 7 shows a flow diagram for a method 700 of encrypting different amounts of different asset types transacted on a blockchain ledger, in an embodiment. Up to now, we have considered a single asset (for example Bitcoin) and transactions which move this asset from one holder to another. Consider an extension of this scheme which supports multiple non-interchangeable asset types (for example, Bitcoin and a US dollar proxy) within single transactions. This increases the value of the chain by allowing it to serve more users, and also enables new functionality, such as atomic trades of different assets. We could accomplish this by attaching to each output an asset tag identifying the type of that asset, and having verifiers check that the verification equation holds for subsets of the transaction which have only a single asset type. (Basically, treating the transaction as multiple single-asset transactions, except that each input signs the entire aggregate transaction.) This requires verification of multiple equations, increases complexity, and more importantly, gives chain analysts an additional data point to consider, reducing the privacy of the users of the chain. This also could lead to censorship of transactions involving specific asset types, since all asset types are visible. We instead propose a scheme for which all asset tags are blinded, so that no relationship between output asset types can be inferred. This avoids the privacy loss and greatly improves privacy by hiding the specific assets used by individual transactions. This is especially important for assets with low transaction volume where use of the asset alone is sufficient to identify users.

A processor may receive a first amount of a first asset and a second amount of a second asset to be transacted at step 710. To describe the technology behind Confidential Assets (i.e. transactions with multiple asset types, such as the transaction shown in FIG. 7), it is useful to start with Pedersen commitments that form the basis of Confidential Transactions:

$$commitment = xG + aH$$

where G is a standard generator of an elliptic curve and H is a second generator for which nobody knows the discrete log with respect to G. Such a generator is referred to herein as a nothing-up-my-sleeve, or NUMS generator. To represent two different assets, the commitments may be represented as:

$$commitment\_1 = xG + aH$$

$$commitment\_2 = xG + aI$$

In such an example, H and I may represent two distinct assets, and thus the two commitments shown, while committing to the same amount a, are commitments to different assets. Each asset (e.g., assets H and I) may have an associated asset tag, the associated asset tags being uniformly random elliptic curve points whose discrete logarithms are not known with respect to each other.

A first blinding value may be added to each asset tag being transacted to create blinded asset tags for each asset, the blinded asset tags being uniformly random elliptic curve points, at step 710. The above discussion assumed every transaction output had a NUMS generator (i.e., asset tag) associated with it, and that outputs of the same asset type would use the same tag. This does not satisfy the privacy goal, because it is visible what type of asset every output represents. This can be solved by replacing each asset tag of a commitment with a blinded asset tag of the form:

$$A = H + rG$$

Here H is an asset tag from above and r is the secret first blinding value. Anybody who knows r can tell what asset H the blinded tag A represents, but to anyone else it will appear to be a uniformly random elliptic curve point. It follows that any commitment to a value with A is also a commitment to the same value with H, so the "outputs minus inputs equals zero" rule from confidential transactions will continue to work when validating transactions:

$$commitment\_A = xG + aA = xG + a(H + rG) = (x + ra)G + aH = commitment\_H$$

As shown below, the introduction of the first blinding factor does not affect the user's ability to produce a rangeproof, though it does make the algebra slightly more complicated when constructing the transaction to balance out to zero.

A blinded asset amount for each asset may be obtained by multiplying the first amount by the first blinded asset tag and the second amount by the second blinded asset tag. Encrypted amounts of each asset may then be created by adding, for each received asset, a second blinding value to each blinded asset amount at step 720. Step 720 logically follows from the discussion above, as the encrypted amount of asset H could be expressed as the following commitment:

$$commitment\_1 = xG + aA$$

where a is the received amount of asset H, A is the blinded asset tag, and xG is the second blinding value.

An output value corresponding to the input value may then be generated and encrypted to create an encrypted output value at step 730. The encrypted output value may follow the same rules as the encrypted output valued described above with respect to FIG. 1. That is, the encrypted output value may include an output blinding amount such that the first blinding value and the output value blinding amount of an asset cancel each other out when added together. Both the received amounts and the generated output values for each asset may be set to fall within a value range, the value range being defined so that a sum of any two values within the range does not exceed an overflow threshold, and such that a sum of the encrypted amounts and encrypted output values for each asset equals zero.

Consider now a complete transaction with two inputs of distinct asset types and two outputs, like so:

$$in1 = xG + aH, H\ \text{-}\ \text{-}\backslash\ \text{/-}\ \text{-}\ uG + cH, H = out1$$

$$|\ \text{-}\ \text{-}\ \text{-}\ |$$

$$in2 = yG + bI, I\ \text{-}\ \text{-/}\ \backslash\ \text{-}\ \text{-}\ vG + dI, I = out2$$

In confidential transactions (described in FIG. 1), only one generator is used, and to verify a transaction's validity, the following equation had to have been satisfied:

$$out1 + out2 - in1 - in2 = 0$$

which it would if and only if the transaction balanced. As it turns out, this same equation works even with multiple assets:

$$0 = out1 + out2 - in1 - in2$$
$$= (uG + cH) + (vG + dI) - (xG + aH) - (yG + bI)$$
$$= (u + v - x - y)G + (c - a)H + (d - b)I$$

Since H and I are both NUMS points, the only way for this equation to hold is if each individual term is 0, and in particular, if c=a and b=d. In other words, this equation holds only if the total amount of asset H is the same on the input side and the output side, and the total amount of asset I is the same on the input side and the output side. This extends naturally to more than two asset tags; in fact, it is possible to support an unlimited number of distinct asset types, as long as each one can be assigned a unique NUMS generator.

As in CT, the simple requirement that the inputs be canceled out by the outputs is insufficient because it is possible for amounts to overflow, effectively allowing negative-valued output values. As in CT, this can be solved by attaching a plurality of rangeproofs to each asset output value at step 740, in exactly the same way as described above in FIGS. 1 and 6 (either rangeproof schema may be used). The only difference is that the verifier must use the appropriate asset tag in place of the fixed generator. Different rangeproofs are associated with each of the generated output values. The rangeproofs may show that the value associated with each rangeproof falls within the value range, and each rangeproof may be associated with a different public key. Each public key may be cryptographically signed with a first ring signature based on a public key of a recipient in the transaction at step 750, thereby encrypting the plurality of rangeproofs exactly as the CT transaction described above in FIG. 1. To optimize memory usage, a single memory amount may be shared among each public key.

To further assist verification of the asset types, differences between the output values and the received amounts of each asset may be generated. These differences for each asset may be signed with a second ring signature that has a difference between the first blinding value and an output coefficient as a private key at step 760, which encrypts the differences for each asset into an asset surjection proof. The use of asset surjection proofs may be advantageous for the following reasons. Since every blinded asset tag looks uniformly random, how can verifiers be sure that the underlying asset tags are legitimate? It turns out that the "sum to zero" rule is not sufficient to prevent abuse. For example, consider the "blinded asset tag"

$$A'=-H+rG$$

Any amount of the blinded asset A' will actually correspond to a negative amount of asset H, which an attacker could use to offset an illegal increase of the money supply (similarly to using a negative output amount). To solve this problem, an asset surjection proof is used. The asset surjection proof is a cryptographic proof that within a transaction every output asset type is the same as some input asset type, while blinding which outputs correspond to which inputs. For example, if A and B are blinded asset tags (e.g., for an encrypted input value and an encrypted output value) which commit to the same asset tag H say, then $$A-B=(H+aG)-(H+bG)=(a-b)G$$

may be used as a signature key with corresponding secret key a-b (where a is the first blinding value coefficient for the received amount of the asset and b is an output coefficient used to blind the output value for the asset). Given a transaction output out1, a second ring signature (proof that one of several secret keys is known that keeps secret which one) may be generated with the keys being the differences between the output values and the received amounts of each asset (e.g., out1–in1, out1–in2, and so on) for every asset in the transaction. If out1 has the same asset tag as one of the inputs, the transaction signer will know the secret key corresponding to one of these differences, and be able to produce the ring signature. The asset surjection proof is therefore defined as this ring signature.

At step 770, the encrypted received amounts, the encrypted output values, the first ring signatures and the second ring signatures may then be stored in a block, the block being published on a blockchain where it may be subsequently verified. This signifies completion of one side of the transaction (much as step 160 in FIG. 1). To facilitate completion of the transaction, in some embodiments at least one rangeproof includes a message from a sender of the first asset and the second asset. The message may include the first blinding value, the second blinding value, and, for each asset sent, the difference between the first blinding value and the output coefficient. As is discussed below, the message may be used by a receiver of the first asset and the second asset to verify completion of a transaction.

Figure 8:
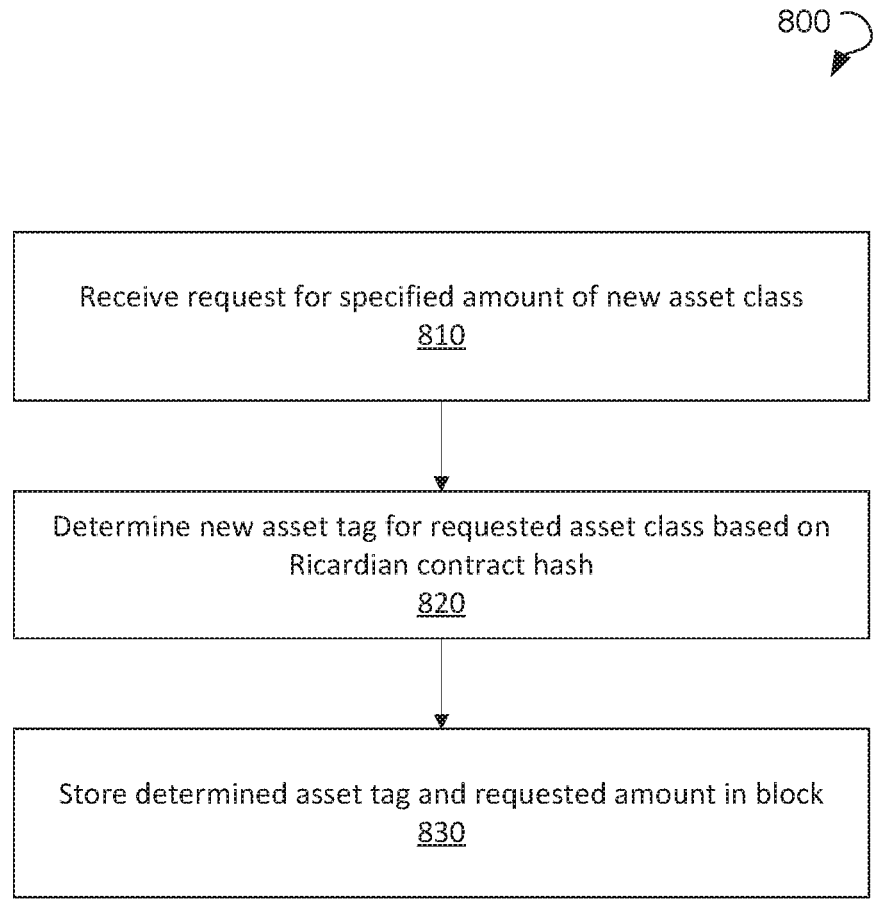
FIG. 8 shows a flow diagram for an issuance transaction on a blockchain creating a new asset class, in an embodiment.

In a multi-asset chain, it may make sense in some contexts for assets of a specific type to be created or destroyed. This may be accomplished using issuance transactions on the blockchain ledger, which create new asset tags and a specified amount of this asset. FIG. 8 shows a flow diagram for an issuance transaction 800 on a blockchain creating a new asset class, in an embodiment. The issuance transaction 800 may be initiated by receiving a request to issue a specified amount of a first asset class at step 810. An associated asset tag corresponding to the new asset class may then be determined at 820, the determined asset tag being a selected point on a uniformly random elliptic curve used for all asset tags. The selected point may be selected such that the selected point cannot be algebraically derived from any other point corresponding to an existing asset tag.

As mentioned above, the asset tag for an asset is an element $H_A \in G$ obtained by execution of the Pedersen commitment Setup using an auxiliary input A. In the context of a blockchain, it is desirable to ensure that any input A is used only once to ensure assets cannot be inflated by means of multiple independent issuances. Associating an issuance with the spend of a UTXO, and a maximum of one issuance per specific UTXO may achieve this uniqueness property. The unambiguous reference to the UTXO being spent is hashed together with a issuer-specified value, the Ricardian contract hash, to generate the auxiliary input A to the Pedersen commitment. See Grigg, I.: The Ricardian contract. In: First IEEE International Workshop on Electronic Contracting. IEEE (2004), which is hereby incorporated by reference. Given an input being spent I, itself an unambiguous reference to an output of another transaction, and the issuer-specified Ricardian contract C, the asset entropy E is defined as Hash(Hash(I)||Hash(C)). The Ricardian contract is a machine parseable legal document specifying the conditions for use, and especially redemption of the asset being issued. The hash of the Ricardian contract C may be an irrevocable committment to the issuance of the asset. Given an asset entropy E, the asset tag is the element $H_A \in G$ obtained by execution of the Pedersen commitment Setup using Hash(E||0) as the auxiliary input. Every non-coinbase transaction input can have associated with it up to one new asset issuance.

An asset issuance input may include an UTXO spend I (interpreted as a non-issuance input of the same transaction); a Ricardian contract C; an initial issuance explicit value $v_0$ or Pedersen commitment H and rangeproof Po; and a Boolean field indicating whether reissuance is allowed. The determined asset tag and the requested amount may then be stored in an issuance block and subsequently published on the blockchain at step 830. Issuance tokens may be created alongside a given asset type, or not, if the asset should not support reissuance. Issuance transactions may be unique in that they are not required to balance to zero. However, if they issue a public amount, it is still verifiable that exactly this amount, no more and no less, was actually issued.

Assets may be either of fixed issuance or, optionally, permit later reissuance using an asset reissuance capability. This capability is a token providing its owner with the ability to change the amount of asset in circulation at any point after the initial issuance. When a reissuable asset is created, both the initial asset issuance and the reissuance capability token are generated at the same time. Later reissuance may be done by proving authority over reissuance tokens, which are related (but distinct) assets. Given an asset entropy E, the asset reissuance capability is the element $H_A \in G$ obtained by execution of the Pedersen commitment Setup using Hash (E||1) as the auxiliary input. An asset which supports reissuance indicates this in its asset issuance input, and the transaction contains an additional output of amount 1 which commits to asset tag $H_A$. Note the parallel to the definition of the asset tag given above, but with the concatenation of a different constant before hashing. In this way an asset tag is linked to its corresponding reissuance capability, and the holder of such a capability is able to assert their reissuance right simply by revealing the blinding factor for the capability along with the original asset entropy.

An asset reissuance input may include a spend of a UTXO containing an asset reissuance capability; the original asset entropy E; the blinding factor for the asset commitment of the UTXO being spent; and either an explicit reissuance amount vi, or Pedersen commitment H and rangeproof Pi. This reissuance mechanism is a specific instance of a general capability-based authentication scheme. It is possible to use the same scheme to define capabilities that gate access to other restricted operations, or use separate capabilities for increasing and decreasing issuance, and explicit vs committed reissuance amounts. In general, the right being protected could even be made extensible by making the commitment generator the hash of a script that validates the spending transaction.

Figure 9:
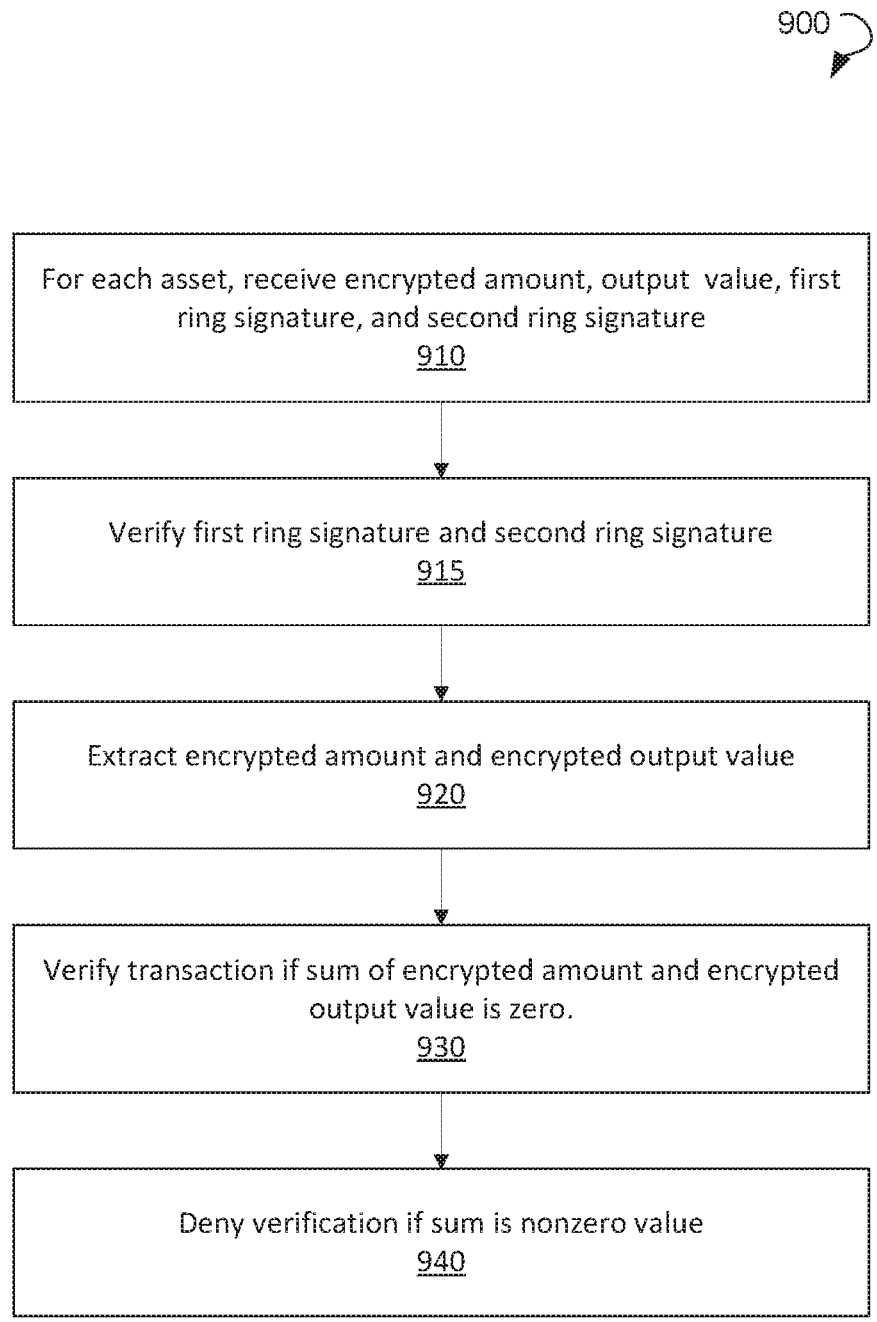
FIG. 9 shows a flow diagram for verifying an encrypted transaction on a blockchain involving different asset types, in an embodiment.

To prove that the asset commitments associated to outputs commit to legitimately issued asset tags, asset surjection proofs are used above which show that outputs commit to the same asset tag as some input (if those inputs are outputs of previous transactions, they have asset surjection proofs showing the same thing, and so on until the process terminates at an asset issuance input which has an explicit asset tag). This allows confidential assets to work on a blockchain which supports indefinitely many asset types, which may be added after the chain has been defined. An alternate scheme, which may be used for a small fixed set of asset tags, is to define the asset tags at the start of the chain, and to have each output include an asset surjection proof to the global list of asset tags. The fixed list of asset tags (having a blinding factor of zero) may be used in place of the list of received asset tags (corresponding to the asset types in the transaction). Instead of using the difference between the blinding factors to sign the second ring signature, this means only the output blinding factors are used to sign the second ring signature. The alternate scheme may be referred to as "small assets" and the more general scheme described above as "big assets." It is also possible to do an intermediate scheme, by having a global dynamic list of assets with each transaction selecting a subset of asset tags which its outputs have an asset surjection proof to. In general, there is room to adapt this scheme for optimal tradeoff between asset surjection proof size and privacy for specific use cases. The small assets solution is advantageously compatible with Mimblewimble, an extension to confidential transactions which improves privacy and scaling by removing information from the transaction graph, while big assets is not. See T. E. Jedusor, Mimblewimble, 2016, Defunct hidden service, http://5pdcbgndmprm4wud.onion/mimblewimble.txt. Reddit discussion at https://www.reddit.com/r/Bitcoin/comments/4vub3y/mimblewimble noninteractive_coinjoin_and_better/, and Poelstra, Andrew, Mimblewimble, 2016, https://download.wpsoftware.net/bitcoin/wizardry/mimblewimble.pdf, which are hereby incorporated by reference Verification of a confidential assets transaction may be similar to the verification of a confidential transaction shown in FIG. 4. For example, FIG. 9 shows a flow diagram for a method 900 of verifying an encrypted transaction on a blockchain involving different asset types, in an embodiment. For each asset type, the encrypted received amount, the encrypted output value, first ring signature, and second ring signature are received in a block appended to the blockchain at step 910. At step 915, the first ring signature and second ring signature are verified, and verification is denied when either ring signature fails verification. The encrypted received amount and the encrypted output value are extracted from the received block at step 920. The encrypted received amount, as described above, includes an amount received of an asset, a blinded asset tag associated with the asset type and a second blinding value. The blinded asset tag includes a first blinding value, and the encrypted output value includes an associated blinding amount. The transaction is verified at step 930 if the sum of the encrypted input value and the encrypted output value is zero, and the transaction is denied verification if the sum of the encrypted input value and the encrypted output value is a nonzero value at step 940.

As for the recipient of the asset having the input value, the amounts and asset types may be decrypted using a private key held by the recipient. The block may be retrieved from the blockchain, by the recipient using a separately-received address. The first ring signature, generated during the encryption process may be regenerated using a private key (e.g., of the recipient). The ring signature may be associated with a correctly-valued public key for each digit of the encrypted input value, in addition to a plurality of incorrectly-valued public keys for each digit. The correctly-valued public key may be selected from a group of, for example, four public keys for each digit of the encrypted input value. An XOR operation may be applied to each digit of the ring-encrypted input value, starting with the smallest digit. The applying the XOR operation may be repeated for each digit of the encrypted input value. A repeated pattern within an output of the XOR operation may be identified. The positions of the repeated pattern within the output of the XOR operation may then be used to determine the received amount of an asset from the encrypted output value.

Figure 10A:
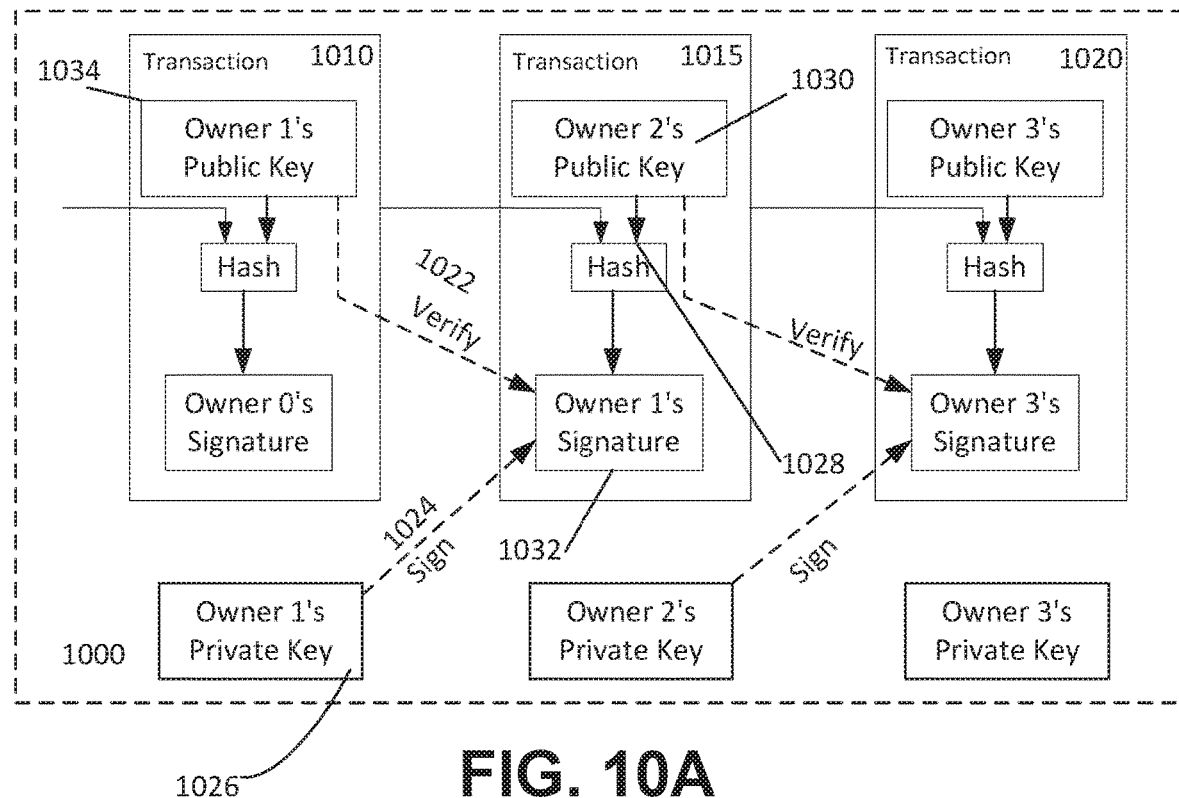
FIGS. 10A-B show simplified block diagrams of a chain of digital signatures of a plurality of transactions and a proof-of-work system, respectively, according to various embodiments.
Figure 10B:
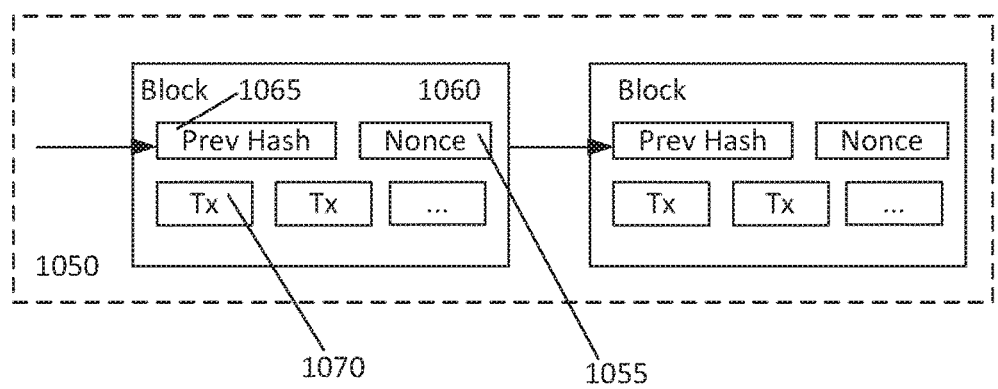

To further elaborate the storing and verification of transactions involving confidential amounts and confidential asset types, FIGS. 10A-B show simplified block diagrams of a chain of digital signatures 1000 of a plurality of transactions and a proof-of-work system 1050, respectively, according to various embodiments. In the digital signature chain 1000, each owner transfers amounts of the assets to the next owner by digitally signing a hash of the previous transaction involving the assets and the public key of the next owner, and adding these to the end of each asset. A payee can verify the transferred signatures to verify the chain of ownership, thus showing the asset to be legitimate. For example, in transaction 1015, the transferring owner, Owner 1, digitally signs hash 1028 of previous transaction 1010 involving the transferred asset and the public key 1030 of Owner 2, the recipient of the asset, to produce a signature for Owner 2 1032 at step 1024. To perform the step of verifying the signature, Owner 2 may use Owner 1's public key 1034 at verification step 1022. Subsequent transaction 1020 may be implemented in the same fashion as transaction 1015.

To assist in making sure a previous owner of an asset did not transact the same asset twice, a proof of work system 1050 may be implemented on each block in a ledger. For an exemplary timestamp scheme, the proof-of-work may be implementing by incrementing a nonce (number used once, a conventional cryptographic concept) 1055 in the block 1060 until a value is found that gives the block's previous hash 1065 the required zero bits initially recorded with the asset. As seen in system 1050 (implemented on a blockchain server, for example,), each block 1060 also includes the first and second ring signatures, encrypted asset tag, and encrypted output amount 1070 stored on the blockchain ledger, as discussed above.

What is claimed is:

1. A method for encrypting amounts and asset types transacted on a blockchain ledger, the method comprising:

receiving, by a processor, a first amount of a first asset and a second amount of a second asset to be transacted, each asset having an associated asset tag, the associated asset tags being uniformly random elliptic curve points whose discrete logarithms are not known with respect to each other;

adding, by the processor, a first blinding value to each asset tag transacted, thereby creating blinded asset tags for each of the first asset and the second asset, the blinded asset tags being uniformly random elliptic curve points;

multiplying, by the processor, the first amount by the first blinded asset tag and the second amount by the second blinded asset tag, the product of each multiplication being a blinded asset amount;

adding, by the processor for each received asset, a second blinding value to each blinded asset amount that is transacted, thereby creating encrypted amounts of the first asset and the second asset;

generating, by the processor, an output value corresponding to each received amount of the received assets;

encrypting, by the processor, the generated output values to create encrypted output values, each encrypted output value including a determined output blinding amount such that the first blinding value and the output value blinding amount of an asset cancel each other out when added together, wherein both the received amounts and the generated output values for each asset fall within a value range, the value range being defined so that a sum of any two values within the range does not exceed an overflow threshold, a sum of the encrypted amounts and encrypted output values for each asset equaling zero;

generating, by the processor, a plurality of rangeproofs for each received asset, wherein different rangeproofs are associated with each of the generated output values, the rangeproofs showing that the value associated with the rangeproof falls within the value range, each rangeproof being associated with a different public key;

signing each public key, by the processor, with a first ring signature based on a public key of a recipient, thereby encrypting the plurality of rangeproofs, wherein a single memory amount is shared among each public key;

generating, by the processor, differences between the output values and the received amounts of each asset;

signing the differences for each asset, by the processor, with a second ring signature having a difference between the first blinding value and an output coefficient as a private key, thereby encrypting the differences into an asset surjection proof; and storing, by the processor, the encrypted amounts, the encrypted output values, the first ring signatures, and the second ring signatures in a block, the block further comprising a digital signature signed using a private key associated with a prior owner, the digital signature comprising a hash of a previous transaction value retrieved from a server over a network from a blockchain stored on the server, the previous transaction value being stored on the server in a prior block; and transmitting, by the processor, the block over the network connection to the server storing the blockchain, the block being subsequently published on the blockchain.

2. The method of claim 1, wherein at least one rangeproof comprises a message from a sender of the first asset and the second asset, the message comprising the first blinding value, the second blinding value, and, for each asset sent, the difference between the first blinding value and the output coefficient, the message being used by a receiver of the first asset and the second asset to verify completion of a transaction.

3. The method of claim 1, further comprising performing an issuance transaction to establish the first asset on the blockchain ledger, the issuance transaction comprising:

receiving a request to issue a specified amount of the first asset class;

determining the associated asset tag corresponding to the new asset class, the determined asset tag being a selected point on a uniformly random elliptic curve used for all asset tags, the selected point being selected such that the selected point can not be algebraically derived from any other point corresponding to an existing asset tag; and storing the determined asset tag and specified amount in a issuance block, the issuance block being subsequently published on the blockchain.

4. The method of claim 3, further comprising providing, in response to the request to issue the first asset class, a reissuance token for the first asset class, the reissuance token generating additional amounts of the first asset class when submitted with a subsequent request to reissue the first asset class.

5. The method of claim 1, wherein each value range is set by a sender of the first amount and the second amount.

6. The method of claim 1, the signing of the first ring signature for each asset comprising;

assigning each digit in the received amount of each asset to a ring, each ring having a plurality of public keys corresponding to possible values of the digit;

encrypting each digit using a digit-specific blinding factor;

assigning a potential value for the digit to a public key for that digit; and generating the ring signature using a private key, the ring signature being associated with a correctly-valued public key for each digit.

7. The method of claim 6, further comprising rewriting the input value into base four, wherein each digit in the rewritten input value is assigned to a ring having four public keys corresponding to possible values of the digit.

8. The method of claim 6, further comprising rewriting the input value a floating point value with a base ten exponent, thereby reducing the number of digits in the input value.

9. The method of claim 1, wherein the block further includes an unencrypted fee associated with the transaction.

10. The method of claim 1, wherein the public key is an elliptic curve cryptography pubkey that uses two generators, wherein the first generator and second generator are discrete logs of each other.

11. The method of claim 1, the processor further receiving amounts of three or more assets, wherein the method of claim 1 is applied to each received asset.

12. A method for verifying an encrypted transaction having a plurality of different assets being transacted on a blockchain ledger, the method comprising, for each received asset type:

receiving, by a processor of a computer system in communication via a network connection with a server storing the blockchain ledger, an encrypted received amount, an encrypted output value, a first ring signature, and a second ring signature in a block appended to the blockchain, the block further comprising a digital signature signed using a private key associated with a prior owner, the digital signature comprising a hash of a previous transaction value stored on the blockchain ledger in a prior block;

verifying, by the processor, that the digital signature is valid using a public key associated with the prior owner, the public key being part of key pair with the private key associated with the prior owner, wherein verification is denied if the digital signature cannot be validated using the public key associated with the prior owner;

verifying, by the processor, the first ring signature and second ring signature, wherein verification is denied if either ring signature fails verification;

extracting the encrypted received amount and the encrypted output value from the received block, the encrypted received amount comprising an amount received of an asset, a blinded asset tag associated with the asset type and a second blinding value, the blinded asset tag comprising a first blinding value, and the encrypted output value comprising an associated blinding amount;

verifying the transaction if the sum of the encrypted received amount and the encrypted output value for the asset is zero; and denying verification to the transaction if the sum of the encrypted received amount and the encrypted output value for the asset is a nonzero value.

13. A method for decrypting amounts and assets transacted on a blockchain ledger, the method comprising:

using a separately-received address to retrieve a block from a blockchain, the block comprising a plurality of asset types, the block further comprising, for each asset type, an encrypted received amount, an encrypted output value, a first ring signature, and a second ring signature, the block being retrieved via a network connection from a server storing the blockchain, the block further comprising a digital signature signed using a private key associated with a prior owner, the digital signature comprising a hash of a previous transaction value retrieved from a server over a network from a blockchain stored on the server, the previous transaction value being stored on the server in a prior block;

for each asset type of the block:
using a private key to access the first ring signature, the first ring signature being associated with a correctly-valued public key for each digit of the encrypted received amount, the correctly-valued public key being selected from a group of four public keys for each digit of the encrypted received amount of the asset, the private key corresponding to a second blinding value;
applying an XOR operation to the smallest digit of the encrypted received amount of the asset;
repeating the applying the XOR operation to each digit of the encrypted received amount of the asset;
identifying a repeated pattern within an output of the XOR operation;
using the positions of the repeated pattern within the output of the XOR operation to determine the received amount from the encrypted received amount of the asset;

using a difference between a first blinding value and an output coefficient to access the second ring signature, the second ring signature being associated with a key value for each digit of a blinded asset tag.

14. The method of claim 13, the first ring signature of each asset comprising a plurality of rangeproofs, wherein at least one rangeproof comprises a message from a sender of the first asset and the second asset, the message comprising the first blinding value, the second blinding value, and, for each asset sent, the difference between the first blinding value and the output coefficient, the message being used by a receiver of the first asset and the second asset to verify completion of a transaction.

15. A method for encrypting an amount transacted on a blockchain ledger, the method comprising:

adding, by a processor, a blinding amount to an input value being transacted, thereby created an encrypted input value;

generating, by the processor, an output value corresponding to the input value;

encrypting, by the processor, the generated output value to create an encrypted output value, the encrypted output value including a corresponding blinding amount such that the input value blinding amount and the generated output value blinding amount cancel each other out when added together, wherein both the input value and the output value being transacted are values falling with a value range, the value range being defined so that a sum of any two values within the range does not exceed an overflow threshold, a sum of the encrypted input value and the encrypted output value equaling zero;

generating, by the processor for the encrypted output value, a plurality of rangeproofs, the rangeproofs showing that the input value falls within the value range, each rangeproof being associated with a different public key, the generating comprising:

converting, by the processor, each rangeproof into a plurality of scalar values, each scalar value having a predetermined number of decimal places;

setting for each plurality of scalar values, by the processor, a selected scalar to zero;

normalizing, by the processor, the remainder of each plurality of scalar values based on an original value of the selected scalar, thereby reducing a number of each plurality of scalar values by one;

completing, by the processor, the plurality of rangeproofs using the normalized scalar values;

signing each public key, by the processor, with a ring signature based on a public key of a recipient, thereby encrypting the remainder of the plurality of rangeproofs, wherein a single memory amount is shared among each public key;

storing, by the processor, the encrypted input value, the encrypted output value, and the encrypted rangeproofs in a block, the block further comprising a digital signature signed using a private key associated with a prior owner, the digital signature comprising a hash of a previous transaction value retrieved from a server over a network from a blockchain stored on the server, the previous transaction value being stored on the server in a prior block; and transmitting, by the processor, the block over a network connection to a server storing a blockchain, the block being subsequently published on the blockchain.

\* \* \* \* \*